United States Patent Office 3,535,250
Patented Oct. 20, 1970

3,535,250
METHOD FOR MANUFACTURING WATER-PROOFING AGENT FOR CEMENT
Masahiro Osaka, Kasuya-cho 32, Setagaya-ku,
Tokyo, Japan
No Drawing. Filed Sept. 18, 1967, Ser. No. 668,653
Int. Cl. C08f 45/36; C09k 3/18
U.S. Cl. 260—23.3       5 Claims

ABSTRACT OF THE DISCLOSURE

A highly water-proofing, weather-proofing and permeating agent for cement is obtained by melting, at 180° C.–200° C., in an inert gas, a mixture of a principal starting material consisting of a resin originated from petroleum, such as a cumarone indene resin, and a metallic soap consisting of a saturated aliphatic acid having 10 or more carbon atoms and a specific metallic element selected from among those listed in the Periodic Table, thereafter adding an alkali stabilizer, such as lanolin, to the resulting fused product, and then liquefying the mixture with a solvent originating from petroleum and a solvent containing chlorine.

BACKGROUND OF THE INVENTION

Field of the invention

The present invention relates to a method for manufacturing a water-proofing agent for cement.

Description of the prior art

Conventional water-proofing agents for cement were applied to the surfaces of construction materials, such as walls or floors, made of cement or water-repelling mortar so that the agents permeated into the interior of such construction materials and filled the pores formed therein. These water-proofing agents of the prior art permeated into the constructing materials to a depth of the order of only 2 mm. below the surfaces of the construction materials and failed to reach a depth greater than this level. Thus, it has been difficult to expect perfect water proofing from the conventional water-proofing agents for cement.

SUMMARY OF THE INVENTION

The present invention has been worked out to improve the shortcomings of the water-proofing agents for cement of the prior art, by providing an outstandingly effective water-proofing agent which, when applied to construction materials having the same cement-to-sand mixing ratio, will permeate to a depth of the order of 7 mm. below the surfaces thereof which is nearly four times the depth reached by the conventional agents, and will thus display thoroughly effective water proofness.

It is, therefore, a primary object of the present invention to provide an improved method for the manufacture of water-proofing agents for cement which has outstanding permeability into constructing materials made of cement and displays sufficient water proofing effects.

Another object of the present invention is to provide a water-proofing agent for cement by first forming a fused mixture by melting, a specifically prepared metallic soap in the principal component which is a resin made with an unsaturated hydrocarbon originating from petroleum. The resins are commercially available at relatively low prices, and the fused mixture increases the permeability and water-repelling ability of the final product. Thereafter, a substance capable of stabilizing the action of alkali isolated in the cement is added in order to increase the weather proofness of said mixture. Finally a solvent originating from petroleum and a solvent containing chlorine are added so that the agent can be conveniently applied to the surfaces of the material to be treated.

Still another object of the present invention is to provide a water-proofing agent having such an increased plasticity as will markedly resist cracking, freezing and melting of the construction materials to which it is applied.

The water-proofing agent for cement which is provided by the present invention is manufactured by mixing the principal components consisting of a resin, such as cumarone indene resin, petroleum made from an unsaturated hydrocarbon originating from petroleum, with a metallic soap. The resin is made from unsaturated hydrocarbons originating from petroleum, and the soap is made from a saturated aliphatic acid having 10 or more carbon atoms and a metallic element selected from the group consisting of metallic elements covered under Group IIb to Group VIa, and the iron group elements of Group VIII of the Periodic Table. The mixture is then heated at a temperature ranging from 180° C. to 200° C. in an inert gas. Thereafter, a substance, such as lanolin, which is capable of stabilizing the action of alkali to the resulting reaction product is added, and then a solvent originating from petroleum and a solvent containing chlorine are added to the resulting mixture.

Resins made from unsaturated hydrocarbons originating from petroleum include cumarone indene resins such as the one below:

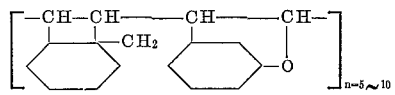

Saturated aliphatic acids having 10 or more carbon atoms are represented by the general formula: $C_nH_{2n+1}COOH$ and include lauric acid ($C_{11}H_{23}COOH$) palmitic acid ($C_{15}H_{31}COOH$), stearic acid ($C_{17}H_{35}COOH$) and naphthene acid

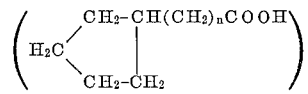

The metallic elements applicable to the present invention include those in the following Periodic Table:

Group IIb—Elements of the zinc group
Group IIIa—Elements of the earth group metals
Group IIIb—Elements of the boron group
Group IVa—Elements of the titanium group
Group IVb—Elements of the carbon group
Group Va—Elements of the vanadium group
Group Vb—Elements of the nitrogen group
Group VIa—Elements of the chromium group
and
Group VIII—Elements of the iron group Substances having stabilizing ability to alkali include the following:

Lanolin
Cholesterol
Paraffin

The term "substances capable of stabilizing alkali" means a substance which can suppress the action of the alkali which is isolated in cement products so that any undesirable action of alkali is prevented from taking place. It has been found as a result of the experiments conducted by the inventor that these substances, such as lanolin, are superior in said suppressing ability and also they have a high permeability and water-repelling ability.

Odorless kerosene is a representative solvent originating from petroleum. The use of odorless kerosene facilitates such operations as the preparation of the water-proofing agents of the present invention, as well as the applications and spraying of the agent onto the surface of a construction material because of the lack of odor, and because it evaporates quickly.

Solvents containing chlorine include: carbon tetrachloride, trichloroethylene and methylene chloride.

The water-proofing agent manufactured according to the present invention in liquid form bears a light brown color. When this agent is applied to the surface of a cement product, the applied surface will have a somewhat light yellow color. As the agent permeates deeper into the cement product and as the solvents evaporate, the cement product regains its own initial color of cement.

Thus, the water-proofing agent of the present invention is suited for use with porous cement products or other porous construction materials, such as concrete walls, concrete floors, concrete pillars, and concrete block, and is also good for slate and brick.

With respect to the metallic soap, it has been noted from experiments that the metallic soaps used in the present invention contain a metal in the range of from 1.5 to 2.0% by weight.

Said solvent originating from petroleum is used because it increases the permeability of the water-proofing agent for cement prepared according to the present invention.

Said solvent containing chlorine is used because it increases the weather-proofness of the water-proofing agent prepared according to the present invention.

PREFERRED EMBODIMENTS OF THE INVENTION

Description will be made in some of the examples of the method for manufacturing a water-proofing agent as follows.

EXAMPLE 1

40 parts (the term "part" or "parts" herein and hereinafter used means a part or parts by weight) of a resin originating from petroleum and 60 parts of zinc stearate (zinc content: 10% by weight) as a metallic soap were charged into a vessel containing an inert gas such as nitrogen or carbonic acid gas. The mixture was heated and fused at a temperature ranging from 180° C. to 200° C. for about 3 hours, followed by quenching to 60° C. at which temperature 20 parts of lanolin was added and fused. Upon completion of the reaction, 35 parts of the reaction product was admixed with 50 parts of odorless kerosene, 10 parts of carbon tetrachloride and 5 parts of trichloroethylene, followed by thorough stirring to form a liquid agent. The use of the odorless kerosene not only serves to minimize the undesirable effect of the agent on the human body due to bad smell which would occur when ordinary kerosene is used, but also facilitates the operation due to lack of bad odor. A solvent containing chlorine such as carbon tetrachloride and trichloroethylene is used in order to control the velocity of drying and to minimize the inflammability of the product.

EXAMPLE 2

42 parts of cumarone indene resin and 67 parts of zinc naphthenate (zinc content: 8% by weight) as a metallic soap were heated and fused at 180° C.–200° C. for 3 hours in a vessel containing an inert gas, followed by quenching to 60° C. at which time 38.5 parts of this reaction product were admixed with 17 parts of lanolin and 1 part of paraffin, and fused. The resulting reaction product was added to 55 parts of odorless kerosene, 10 parts of trichloroethylene and 3 parts of methylene chloride followed by thorough stirring to form liquid-form water-proofing agent for cement.

This water-proofing agent for cement, prepared according to the present invention, not only facilitates the applicating operation due to its liquid form and lack of odor, but also is of an outstanding permeability and water-repelling ability, in addition to the advantage that the starting materials are easily available at low prices and that, accordingly, the product can be provided at a very low price.

What is claimed is:

1. A method for manufacturing a water-proofing agent for cement comprising the steps of:
    (A) mixing 40 to 42 parts by weight of coumarone indene resin, and 60 to 67 parts by weight of a metallic salt of an aliphatic monocarboxylic acid having 10–18 carbon atoms, the metallic component being selected from the group consisting of metallic elements from Groups IIb to VIa and iron metallic elements of Group VIII of the Periodic Table;
    (B) reacting and fusing said mixture by heating at a temperature ranging from 180–200° C. for about 3 hours in an inert gas atmosphere;
    (C) quenching said mixture to a temperature of about 60° C.;
    (D) adding 17–20 parts by weight of a material selected from the group consisting of lanolin, cholesterol, and paraffin;
    (E) fusing the thus formed mixture, and
    (F) adding to said mixture 50 to 55 parts by weight of odorless kerosene, and 3 to 10 parts by weight each of at least one chlorinated solvent selected from the group consisting of carbon tetrachloride, trichloroethylene and methylene chloride.

2. The method of claim 1 wherein said monocarboxylic acid is selected from the group consisting of lauric acid, palmitic acid and stearic acid.

3. The method of claim 1 wherein said metal is present in said salt in an amount of from 1.5 to 2.0% by weight.

4. The method of claim 1 wherein said material in step D is lanolin.

5. The method of claim 1 wherein two of said chlorinated solvents are utilized, and one is carbon tetrachloride.

References Cited

UNITED STATES PATENTS

| | | | |
|---|---|---|---|
| 2,015,796 | 10/1935 | Hans et al. | 260—23.3 |
| 2,022,405 | 11/1935 | Cleaveland | 260—23.3 |
| 2,243,078 | 5/1941 | Bjorksten et al. | 260—23.3 |
| 2,287,513 | 6/1942 | Corkery et al. | 260—23.3 |
| 2,396,342 | 3/1946 | Quick | 260—4 |
| 2,615,815 | 10/1952 | Galvin et al. | 106—14 |
| 2,672,793 | 3/1954 | Rowe et al. | 94—3 |

DONALD E. CZAJA, Primary Examiner

R. A. WHITE, Assistant Examiner

U.S. Cl. X.R.

260—28.5, 31.2, 33.4, 33.6, 33.8, 34.2